United States Patent
Haerr et al.

(10) Patent No.: US 7,216,577 B2
(45) Date of Patent: May 15, 2007

(54) VACUUM BOOSTER WITH LOW FORCE LOSS

(75) Inventors: Timothy Allen Haerr, Enon, OH (US); Gary C. Fulks, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/214,132

(22) Filed: Aug. 29, 2005

(65) Prior Publication Data

US 2007/0044648 A1    Mar. 1, 2007

(51) Int. Cl.
*F15B 9/10* (2006.01)
(52) U.S. Cl. .............. 91/376 R; 91/369.1; 91/415
(58) Field of Classification Search .......... 91/369.1, 91/396.2, 376 R, 415
See application file for complete search history.

(56) References Cited

U.S. PATENT DOCUMENTS

| | | | |
|---|---|---|---|
| 3,237,526 A | 3/1966 | Hayes et al. | 91/376 R |
| 4,345,506 A | 8/1982 | Ohomi | 91/376 R |

*Primary Examiner*—Michael Leslie
(74) *Attorney, Agent, or Firm*—Scott A. McBain

(57) ABSTRACT

A vacuum booster includes a housing defining a control volume in which a movable diaphragm separates the control volume into an apply chamber and a vacuum chamber. A power piston extends through and engages the diaphragm and has an axial bore containing a valve assembly that controls a diaphragm pressure differential across the diaphragm. The power piston drives an output rod in the forward direction. The output rod has a rearward portion exposed to pressure within the vacuum chamber and a forward face exposed to atmospheric pressure. When the pressure within vacuum chamber is less than atmospheric, a piston pressure differential across the power piston provides a return force in the rearward direction to the power piston.

17 Claims, 4 Drawing Sheets

VACUUM BOOSTER WITH LOW FORCE LOSS

BACKGROUND

The present application relates to pneumatic, power-assisted systems, and more particularly, relates to vacuum boosters that use vacuum and atmospheric pressure to provide power-assist to a master cylinder of a fluid brake system.

Conventional automotive vacuum boosters are well-known for providing power-assist for braking a motor vehicle. Such vacuum boosters include a control volume partitioned by at least one movable diaphragm attached to a power piston. When an operator depresses the brake pedal, thereby applying an input force via a linkage to an input rod of the vacuum booster, a valve system actuates to create a large pressure differential across each diaphragm, thus forcing the power piston to move from a rest position to an apply position. The power piston pushes against an output rod that applies an output force many times the input force to the master brake cylinder of the braking system, which in turn actuates the brakes of the vehicle wheels.

Conventional automotive vacuum boosters have return springs to bias the power piston to the rest (rearward) position and to ensure that the vacuum booster does not self apply and create brake drag. When the operator applies a pedal force to brake the vehicle, a component of the pedal force is necessary to compress the return spring. Compressing the return spring does not contribute to braking the vehicle and therefore is a direct force loss to the brake system. This force loss is especially significant when the operator needs to brake when the engine of the vehicle has stopped running, and vacuum is no longer supplied to the vacuum booster. The pedal force required to compress the return spring may be, for example, about 20 pounds (89 Newtons). Since stopping distance directly relates to pedal force, an increase in force loss of the brake system results in an increase in stopping distance required. Due to governmental "power-off" requirements, automotive manufacturers and suppliers are scrutinizing vacuum booster force loss. Accordingly, there is a need for a vacuum booster that has lower force loss, especially during a power-off situation, than conventional vacuum boosters.

SUMMARY

A first embodiment of the disclosed vacuum booster may include a housing having a forward side, a rearward side and shaped to form a longitudinal axis therebetween. The housing defines a control volume having an apply chamber and a vacuum chamber separated by a diaphragm that is movable along the longitudinal axis. The vacuum booster also includes a power piston movable along the longitudinal axis and having a rearward end and a forward end. The power piston extends through and engages the diaphragm and includes an axial bore containing a valve assembly that controls a pressure differential, hereinafter referred to as a diaphragm pressure differential, acting on the diaphragm. The vacuum booster further includes an output rod extending along the longitudinal axis through the forward side of the housing. The output rod engages the forward end of the power piston to transmit an output force. The output rod has a rearward portion exposed to pressure within the vacuum chamber and a forward face exposed to atmospheric pressure. When the pressure within the vacuum chamber is less than atmospheric pressure, a pressure differential, hereinafter referred to as a piston pressure differential, acts on the power piston to provide a return force on the power piston in the rearward direction.

In a second embodiment, a vacuum booster may include a housing that is separated by a divider plate to form a first control volume and a second control volume. The booster may include a primary diaphragm that separates the first control volume into an primary apply chamber and a primary vacuum chamber. A secondary diaphragm separates the second control volume into a secondary apply chamber and a secondary vacuum chamber. The primary and the secondary diaphragms are movable along the longitudinal axis of the housing. The vacuum booster may further include a power piston movable along the longitudinal axis and having a rearward end and a forward end. The power piston may extend through and engage the primary and secondary diaphragms, and may include an axial bore containing a valve assembly that controls a diaphragm pressure differential acting on the primary and secondary diaphragms. The vacuum booster may further include an output rod extending along the longitudinal axis through the forward side of the housing. The output rod may engage the forward end of the power piston to transmit an output force. The output rod has a rearward portion exposed to pressure within the secondary vacuum chamber and a forward face exposed to atmospheric pressure. When the pressure within the primary and secondary vacuum chambers is less than atmospheric, a pressure differential across the power piston provides a return force in the rearward direction to the power piston.

In another aspect of the invention, a fluid brake system is provided for a motor vehicle of a type having a foot pedal, a foot pedal linkage, and a vacuum source. The fluid brake system may include a set of fluid actuatable brakes in the wheels of the vehicle and in fluid communication with a master brake cylinder. The fluid brake system may further include a vacuum booster adapted to be in fluid communication with the vacuum source and operatively engaged to the master brake cylinder. The vacuum booster may include a housing that defines a control volume and that has a forward side, a rearward side and is shaped to define a longitudinal axis extending therebetween. A diaphragm movable along the longitudinal axis may be positioned to separate the control volume into an apply chamber and a vacuum chamber. The vacuum booster may further include a power piston movable along the longitudinal axis. The power piston may extend through and engage the diaphragm, and include an axial bore containing a valve assembly that controls a diaphragm pressure differential acting on the diaphragm. The vacuum booster may further include an input rod extending along the longitudinal axis through the rearward side of the housing and engaging the rearward end of the power piston to transmit an input force. The vacuum booster may further include an output rod extending along the longitudinal axis through the forward side of the housing. The output rod may engage the forward end of the power piston to transmit an output force. The output rod may have a rearward portion exposed to pressure within the secondary vacuum chamber and a forward face exposed to atmospheric pressure. When the pressure within the vacuum chamber is less than atmospheric, a pressure differential across the power piston provides a return force in the rearward direction to the power piston. The operator may apply a pedal force to the foot pedal to create the input force to the vacuum booster and to actuate the set of brakes.

Other aspects and embodiments of the vacuum booster with low force loss will become apparent from the following description, the accompanying drawings and the appended claims.

DETAILED DESCRIPTION

Figure 1:
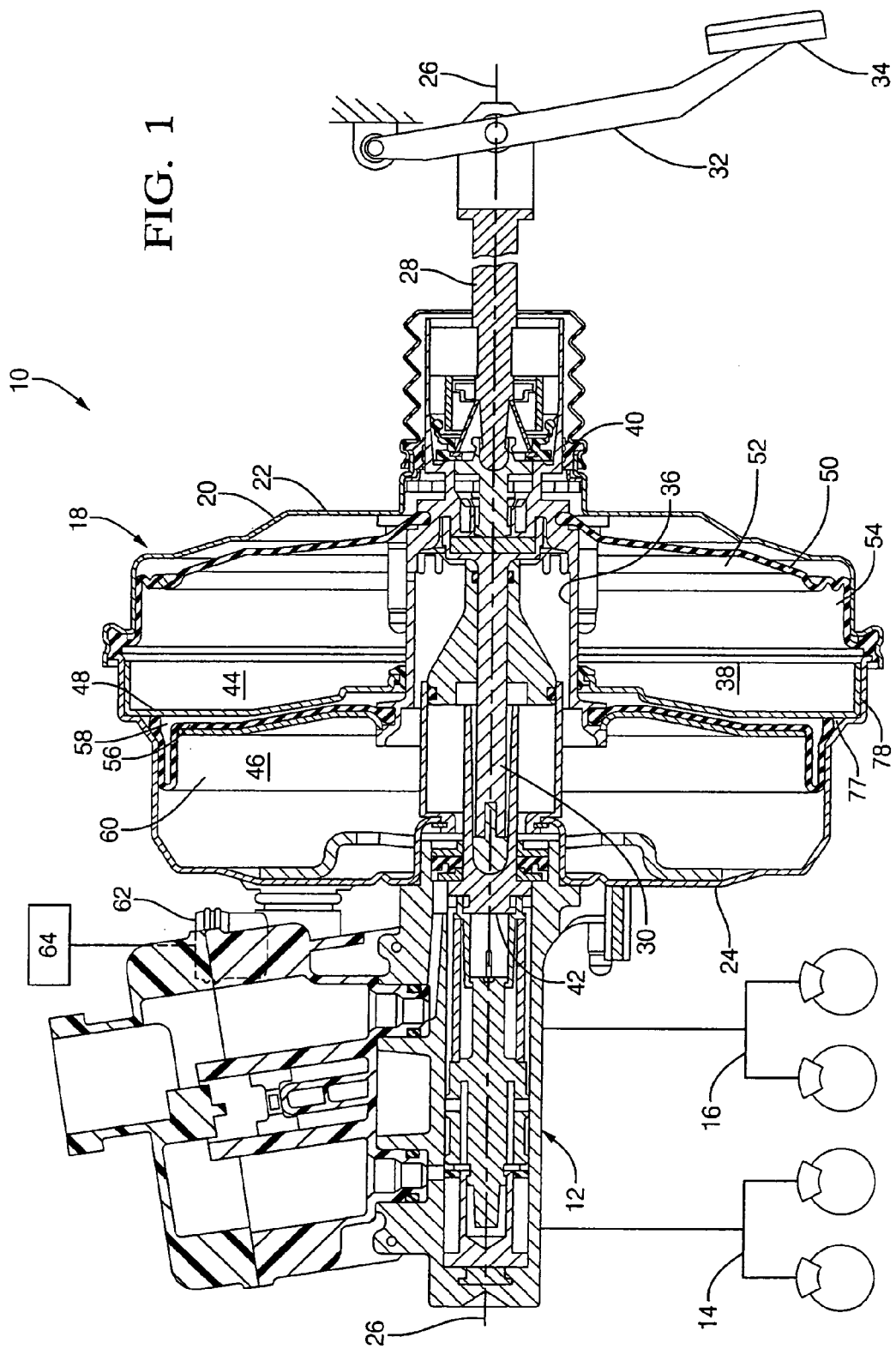
FIG. 1 illustrates a schematic of a fluid brake system and a sectional view of a first embodiment of a vacuum booster in a rest position.

FIG. 1 shows a fluid brake system, generally designated 10, for a motor vehicle and includes a master brake cylinder 12, a set of fluid actuatable brakes including a front brake system 14 and a rear brake system 16, a foot pedal linkage 32 and a foot pedal 34. Brake system 10 may further include a first embodiment of a vacuum booster 18, which has a housing 20 with a rearward side 22, a forward side 24 and a longitudinal axis 26 extending therebetween. Vacuum booster 18 has an input rod 28 extending through rearward side 22 and an output rod 30 extending through forward side 24. An operator provides an input force to input rod 28 via foot pedal linkage 32 and foot pedal 34.

Vacuum booster 18 may further include a power piston 36 that has a forward end 38, a rearward end 40 and is movable relative to housing 20 along longitudinal axis 26. Input rod 28 engages rearward end 40 of power piston 36, and output rod 30 engages forward end 38 of power piston 36. During braking (i.e., when an operator depresses pedal 34 so that linkage 32 displaces input rod 28 to the left), power piston 36 drives output rod 30 forwardly (to the left in FIG. 1) along longitudinal axis 26. Output rod 30 transmits an output force to a primary piston 36 of master brake cylinder 12 mounted on forward side 24 of housing 20. When the operator removes the input force (i.e., does not depress pedal 3), power piston 36 and output rod 30 move in the rearward direction (to the right in FIG. 1) to return to the rest position without the need for a return spring acting on power piston 36.

Still referring to FIG. 1, housing 20 defines a primary control volume 44 and a secondary control volume 46, separated by a divider plate 48. Primary control volume 44 may have a primary diaphragm 50, which separates primary control volume 44 into a primary apply chamber 52 and a primary vacuum chamber 54. Secondary control volume 46 may have a secondary diaphragm 56, which may separate secondary control volume 46 into a secondary apply chamber 58 and a secondary vacuum chamber 60. During normal braking, primary diaphragm 50 and secondary diaphragm 56 may operate in tandem to drive power piston 36 in the forward direction. A vacuum check valve 62 may be in fluid communication with and in between vacuum booster 18 and a vacuum source 64, which may be the vehicle engine manifold or a vacuum pump. Vacuum check valve 62 prevents air from entering vacuum booster 18 through vacuum check valve 62 when vacuum source 64 is not operating.

Vacuum booster 18 provides braking power-assist to the driver during a power-on condition, when vacuum source 64 is operating (i.e., the vehicle engine is running.) During power-on, the output force through output rod 30 may be, for example, approximately eight times the input force to input rod 28. Since a typical mechanical advantage of foot pedal linkage 32 is about 3:1, the output force through output rod 30 may be about 24 times the pedal force provided by the operator. During a power-off condition, vacuum source 64 is not operating (i.e., the vehicle engine is not running.) Some amount of power-assist remains until air enters primary and secondary vacuum chambers, 24 and 28, respectively, of vacuum booster 18. During power-off, the output force of output rod 30 of vacuum booster 18 is approximately equal to the input force applied to rod 12 (and about three times the pedal force.) Vacuum booster 18, therefore, provides a substantially lower force loss during both the power-on and power-off conditions than conventional vacuum boosters, although the lower force loss is more noticeable by the operator during power-off.

Figure 2:
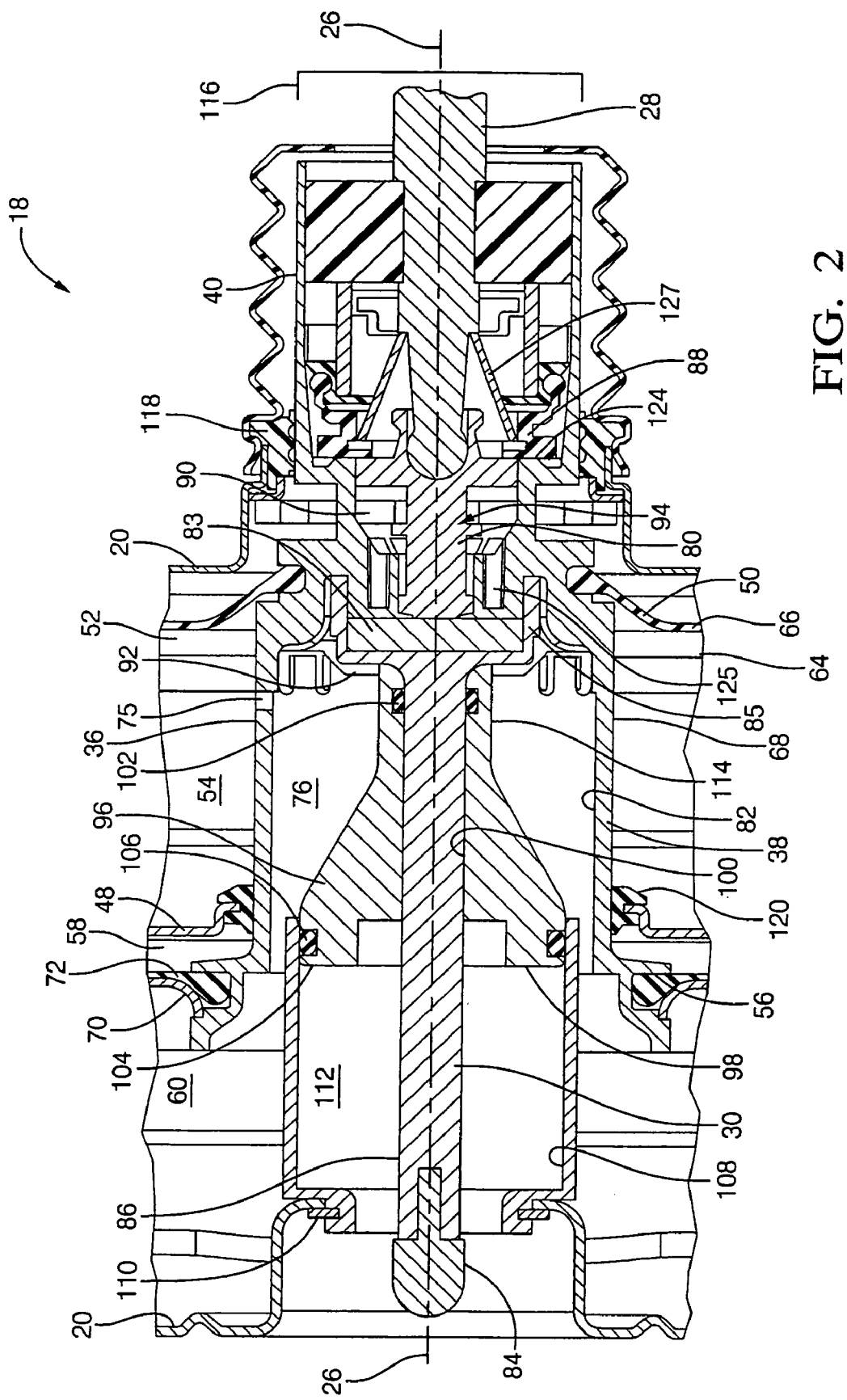
FIG. 2 is a sectional view of a detail of the vacuum booster shown in FIG. 1.

As shown in FIG. 2, primary diaphragm 50 may include a first rigid support plate 64 backing a first elastomeric membrane 66 and may be attached to and form a seal with an outer periphery 68 of power piston 36. Secondary diaphragm 56 may include a second rigid support plate 74 backing a second elastomeric membrane 72 that may be attached to and form a seal with outer periphery 68 of power piston 36. Divider plate 48 may be formed of a metal and include a bearing seal 120 that seals around outer perimeter 95 of power piston 36, and allows movement of power piston 36 along longitudinal axis 26. Primary and secondary vacuum chambers, 24 and 28, respectively, are in fluid communication by way of an air passage 75 through power piston 36, and always is pressurized to below atmospheric pressure during power-on. The term "vacuum" as used herein shall mean the partial vacuum pressure supplied by vacuum source 64, or any pressure less than atmospheric pressure. A typical vacuum pressure for automotive applications is about 20 mm Hg. Primary and secondary apply chambers, 22 and 26, respectively, are in fluid communication by way of an air passage 77 (see FIG. 1) around an outer periphery 78 of divider plate 48 and only contain a vacuum when vacuum booster 18 is in the rest position during power-on.

Still referring to FIG. 2, vacuum booster 18 may further include a spool-shaped air valve 80 seated inside the rearward portion of an axial bore 82 of power piston 36 along axis 26 and between input rod 28 and output rod 30. Input rod 28 may push against the rearward end of air valve 80. The forward end of air valve 80 pushes against a rubber reaction disc 83, which seats inside of a cupped, rearward end 85 of output rod 30. An output rod tip 84 may transmit force from a forward end 86 of output rod 30 to primary piston 34 of master brake cylinder 12. A floating control valve 88 may be positioned in the rearward portion of axial bore 82 of power piston 36 around input rod 28 and seal against the rearward end of air valve 80 when vacuum booster 18 is in the rest condition. A rigid push plate 90 may fit over air valve 80 and may be positioned in the rearward end of power piston 36. An output rod retainer 92 may retain output rod 30 inside of power piston 36 so that forward end 86 of output rod 30 is approximately in proper alignment for assembly to master brake cylinder 12.

Reaction disc 68, air valve 80, floating control valve 88, push plate 90 and valve seat 64 may also be referred to collectively as a valve assembly 94, which may be positioned in axial bore 82 of power piston 36. Valve assembly

94 is one example of numerous, known valve assemblies that may be adapted to vacuum booster 18.

Still referring to FIG. 2, vacuum booster 18 may further include an output rod collar 96 attached to output rod 30 and positioned inside of air passage 76, which is defined by the forward portion of axial bore 82 of power piston 48. In this embodiment, collar 96 may have a funnel-like shape with a forward face 98 that may be exposed to atmospheric air pressure. Collar 96 may include an axial bore 100 with an internal seal 102 for sealed assembly onto the rearward portion of output rod 30. An outer periphery 104 of forward face 98 may include an external seal 106 that slides against and forms a seal with the inside of a cylindrical sleeve 108 coaxially mounted to forward side 24 of housing 20 with a retaining clip 110. Sleeve 108 defines a sleeve chamber 112, which vents to atmosphere through air passages in the attachment of master brake cylinder 12 to housing 20, so that atmospheric pressure may act upon forward face 98 of collar 96.

Collar 96 may move together with output rod 30 along axis 26. Therefore, collar 96 and output rod 30 may be unitarily formed to eliminate the need for internal seal 102, thus simplifying the manufacture and perhaps increasing the reliability of vacuum booster 18.

In conventional vacuum boosters, when the input force is zero (brakes released) a piston pressure differential acting upon the power piston biases the power piston to move in the forward direction. The brake system would "self-apply" if it were not for a return spring pushing the power piston in the rearward direction. In such vacuum boosters, the return spring provides a return force that is greater than a self-apply force produced by the piston pressure differential. In vacuum booster 18, however, the piston pressure differential produces a return force in the rearward direction rather than a self-apply force in the forward direction, and a return spring is not required. When no input force is applied, the return force is sufficient to move or hold power piston 36 at the rest position.

In order to generate a return force, forward face 98 of collar 96 has an area that is at least slightly greater than a rearward, projected area 116 of power piston 36, and both forward face 98 and projected area 116 are exposed to atmospheric pressure. A rearward portion 114 of collar 96 is located inside of air passage 76 and is exposed to vacuum during power-on. The area of forward face 98 is significantly greater than the cross-sectional area of rearward portion 114. A pressure differential across collar 96 during power-on biases collar 96 in the rearward direction, thus pushing output rod 30 in the rearward direction (to the right in FIG. 2). Output rod 30, in turn, pushes on power piston 36 in the rearward direction with a slightly greater force than the force resulting from atmospheric air pressure acting upon projected area 116 of power piston 36, so that power piston 36 returns to the rest position during power-on when no input force is applied to input rod 28. This arrangement thereby eliminates the need for a return spring or other mechanical biasing means positioned on the forward end of power piston 36. The relatively small remaining force losses during operation of vacuum booster 18 may be attributed primarily to friction of power piston 36 sliding in a first bearing seal 118 on housing 20 and a second bearing seal 120 on divider plate 48.

The operation of vacuum booster 18 is next described for five, exemplary situations during the braking of a motor vehicle, although vacuum booster 18 may be used for other power-assist applications also. The operation of vacuum booster 18 is described for the power-on situations when the brakes are at rest, when the brakes are applied, and when the brakes are held at a particular position, and for the power-off situation when vacuum failure occurs.

When the brakes are at rest and no force is applied to input rod 28, vacuum source 64 draws air out of primary and secondary vacuum chambers, 28 and 24, respectively, through check valve 62 by way of air passages 75, 76. With air valve 80 holding floating control valve 88 off a valve seat 124 of power piston 36, air is evacuated by way of air passage 125 from primary and secondary apply chambers, 22 and 26, respectively. Air valve 80 seats on floating control valve 88, thus preventing the entrance of air into the rearward end of power piston 36, and into primary and secondary apply chambers, 22 and 26, respectively. A floating control valve spring 127 holds floating control valve 88 against valve seat 124. With vacuum on both sides of primary and secondary diaphragms 50 and 56, respectively, atmospheric pressure acting on forward face 98 of collar 96 is able to hold power piston 36 against the rearward side of housing 20.

When a driver pushes foot pedal 34, input rod 28 displaces air valve 80 and floating control valve 88 forward together until floating control valve 88 contacts valve seat 124 on power piston 36. As air valve 80 continues its forward movement, it unseats itself from floating control valve 88. There is now an opening between air valve 80 and floating control valve 88, but no opening between floating control valve 88 and power piston 36. When this occurs, vacuum source 64 is shut off from primary and secondary apply chambers, 52 and 58, respectively, and air at atmospheric pressure enters in through air passage 125. Since there is still vacuum in primary and secondary vacuum chambers, 54 and 60, respectively, a diaphragm pressure differential results in a forwardly directed operating force acting on each of primary and secondary diaphragms, 50 and 56, respectively, which are connected to power piston 36. The operating force causes power piston 36 and output rod 30, to move forwardly and actuate master brake cylinder 12.

As the hydraulic line pressure of the braking system increases during braking, vacuum booster 18 provides a mechanical feedback force to foot pedal 34 through air control valve 80. Output rod 30 transmits the rearwardly directed force from primary piston 34 of master brake cylinder 12 to reaction disc 83, which compresses and provides a response much like a highly compressed fluid. A portion of the total force from master brake cylinder 12, therefore, transfers to air valve 80 and input rod 28, and finally to foot pedal 34. This gives the driver a brake-apply feel, which is proportional to the degree of braking. This feedback also closes air valve 80 and prevents any further increase in apply pressure until the driver pushes foot pedal 34 harder.

When the brakes are in the hold position, floating control valve 88 stays in contact with valve seat 64 of power piston 36, thereby shutting off vacuum source 64 to the primary and secondary apply chambers, 52 and 58, respectively. At the same time floating control valve 88 travels forward with power piston 36 to reseat on air valve 80. This shuts off additional air from entering primary and secondary apply chambers, 52 and 58, respectively. Air valve 80 and control valve 88 remain stationary until the driver releases or applies more force to the brake pedal. Releasing all of the forces on the brake pedal allows power piston 36 to return primary and secondary diaphragms, 50 and 56, respectively, to the rest position, due to the pressure differential always acting upon collar 96 during power-on.

In case of vacuum failure or interruption, vacuum booster 18 "stores" enough vacuum to make about one or two power-assisted stops. Once the stored vacuum is exhausted, the driver may still operate brake system 10 without power-assist. The pedal force required, of course, is considerably greater than with power-assist, although elimination of the power piston return spring used in conventional vacuum boosters significantly lowers the required force to achieve a given amount of braking.

Figure 3:
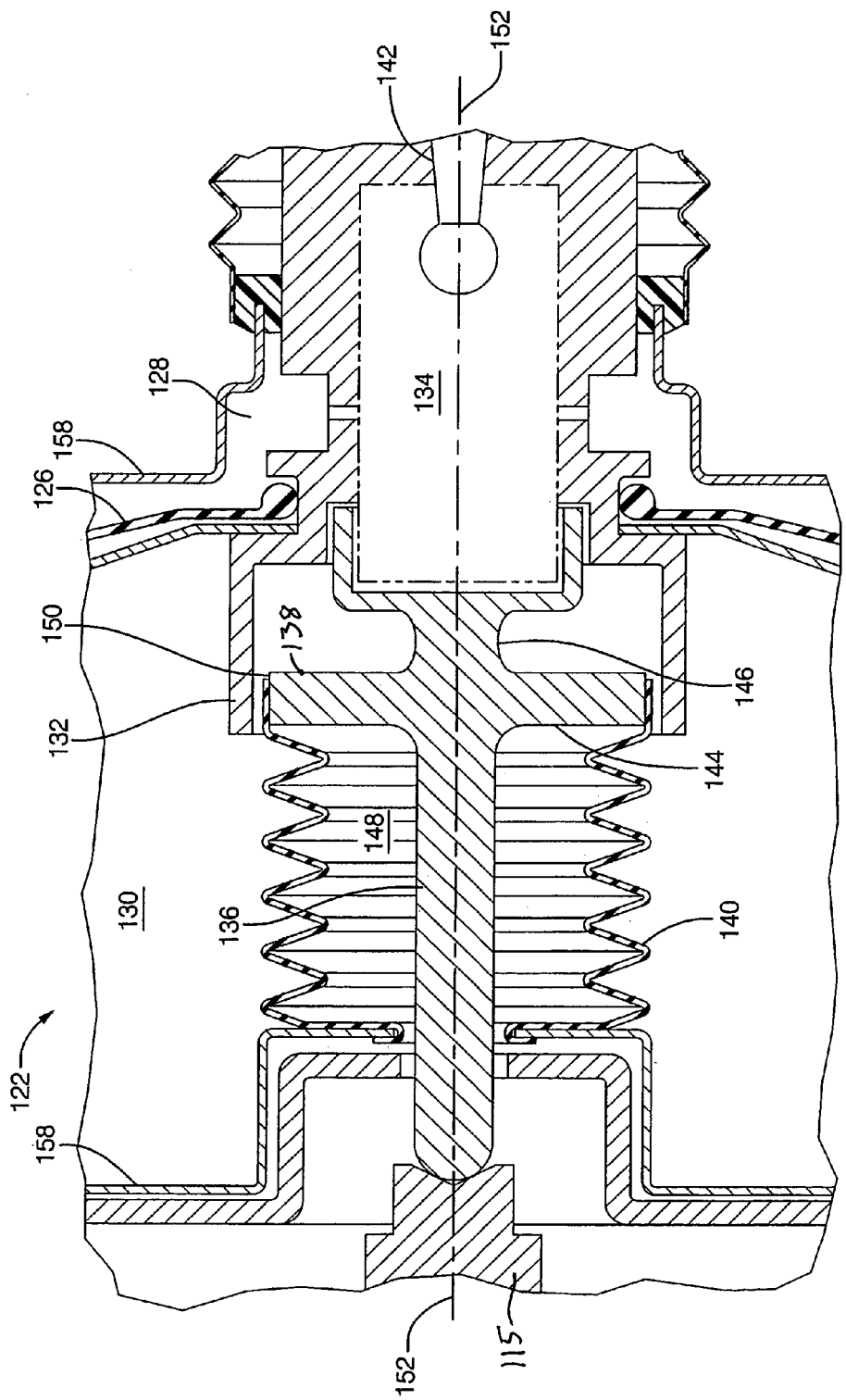
FIG. 3 is a sectional view of a second embodiment of a vacuum booster in a rest position.

FIG. 3 shows a representation of a second embodiment of a vacuum booster 122, which includes a single diaphragm arrangement rather than the tandem diaphragm arrangement of vacuum booster 18 shown in FIG. 1. Vacuum booster 122 may include a housing 158 partitioned by a diaphragm 126 into an apply chamber 128 and a vacuum chamber 130. Vacuum booster 122 may further include a power piston 132, a valve assembly 134, an output rod 136, an output rod collar 138, a flexible sleeve 140, and an input rod 142 aligned with an elongated axis 152. Valve assembly 134 may be similar in design and operation to valve assembly 94 of vacuum booster 18 in FIG. 1. Output rod 136 and output rod collar 138 may be unitarily formed, such as from a carbon steel. A forward face 144 of collar 138 may have a diameter significantly greater than the diameter at a rearward portion 146 of output rod 136. Flexible sleeve 140 may be a rubber bellows, for example, and define a sleeve chamber 148 that vents to atmosphere through the attachment of a master brake cylinder to housing 158. The forward end of flexible sleeve 140 attaches to and forms a seal against housing 158. The rearward end of flexible sleeve 140 attaches to and forms a seal against an outer perimeter 150 of collar 138. Output rod 136 transmits an output force from power piston 132 to a primary piston 115 of the master brake cylinder.

Like vacuum booster 18 of FIG. 1, vacuum booster 122 of FIG. 3 also may incorporate a piston pressure differential rather than a return spring to return power piston 132 from the applied position to the rest position, thereby lowering force loss. The diameter (and surface area) of forward face 144 is at least slightly greater than the diameter (and surface area) of a projected area of the rearward end of power piston 132. During the power-on condition, and initially during a vacuum-failure condition, the atmospheric air pressure in sleeve chamber 148, normally acting upon forward face 144 of collar 148, provides a rearwardly directed return force to power piston 132.

Figure 4:
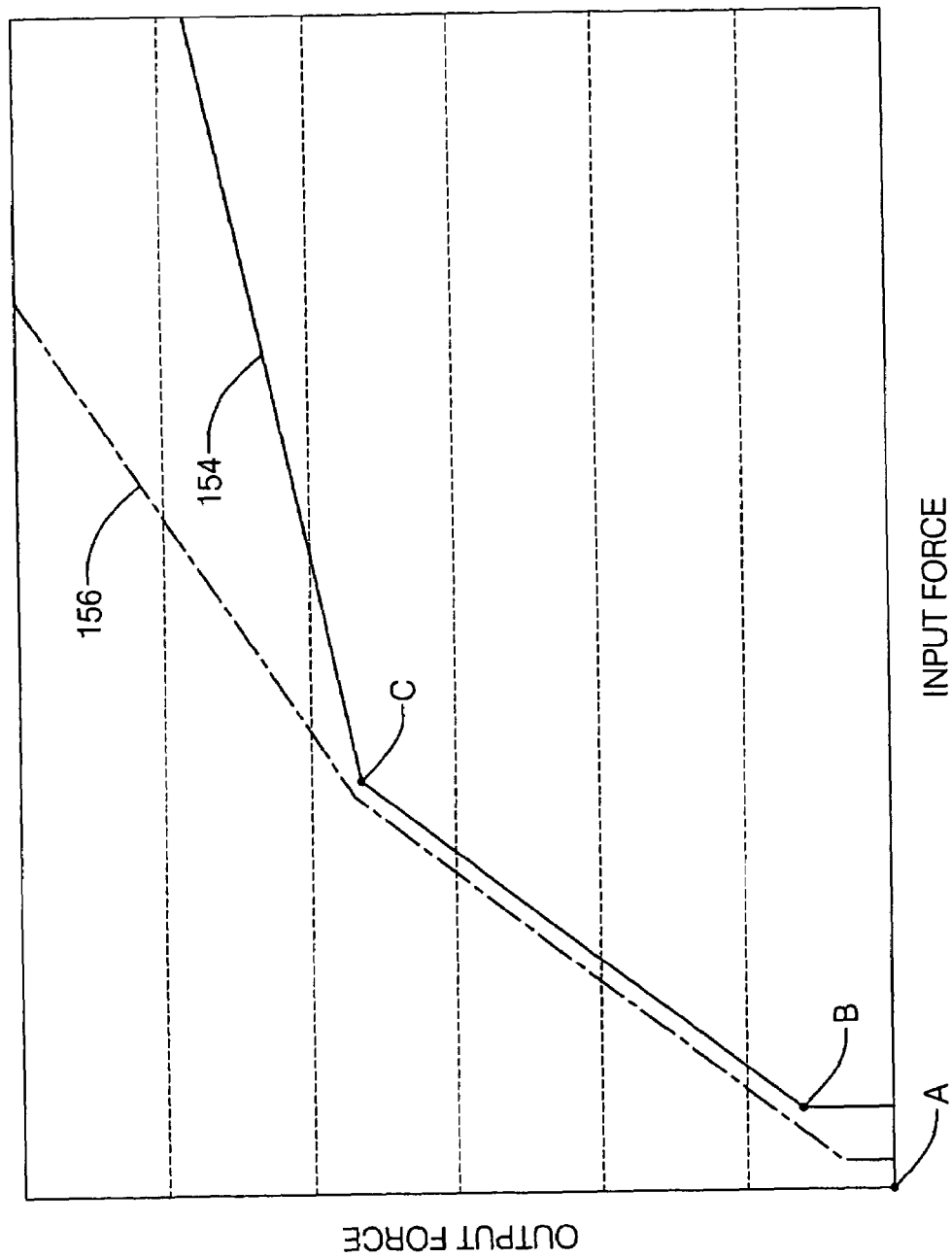
FIG. 4 is a graph of input force versus output force during operation for the vacuum booster in FIG. 1 and a conventional vacuum booster.

FIG. 4 shows an exemplary curve 154 of input force of input rod 28 versus output force of output rod 30 of vacuum booster 18 during operation. Curve 156 is an exemplary curve of input force versus output force of a conventional vacuum booster (that has a power piston return spring) with equivalent power-assist capability. Point A denotes a "rest" position during power-on when the operator does not apply an input force (brakes are released). Point B denotes the beginning of an apply stage of operation, also referred to as "poise", during which vacuum booster 18 provides power-assist to produce an output force that is several times (7–8 times, for example) the input force. Point C denotes the beginning of a stage of operation referred to as "run-out" during which there is no additional power-assist provided by vacuum booster 18. Enough vacuum remains in both vacuum booster 18 and the conventional vacuum booster to provide some power-assist for one or two actuations of the foot pedal. Once the conventional vacuum booster represented by curve 156 has lost all vacuum, the additional output force supplied is significantly less than the additional input force applied. For vacuum booster 18 represented by curve 154, however, additional output force supplied is approximately equal to additional input force applied.

Although the vacuum booster with low force loss has been shown and described with respect to certain aspects and embodiments, it should be understood that modifications may occur to those skilled in the art upon reading the specification. The vacuum booster includes all such modifications and is limited only by the scope of the claims.

What is claimed is:

1. A vacuum booster comprising:
   a housing having a forward side, a rearward side and a longitudinal axis extending therebetween, the housing defining a control volume;
   a diaphragm separating the control volume into an apply chamber and a vacuum chamber, the diaphragm being movable along the longitudinal axis;
   a power piston movable along the longitudinal axis and having a rearward end and a forward end, the power piston extending through and engaging the diaphragm, and including an axial bore; wherein the rearward end of the power piston is exposed to atmospheric pressure
   a valve assembly positioned in the axial bore controlling a diaphragm pressure differential acting on the diaphragm;
   an output rod extending along the longitudinal axis through the forward side of the housing, the output rod engaging the forward end of the power piston to transmit an output force; and
   an output rod collar connected to the output rod, the output rod collar having a forward portion exposed to atmospheric pressure, wherein a surface area of the forward portion of the output rod collar is greater than a surface area of the rearward end of the power piston such that a pressure differential is established to urge the power piston in a rearward direction.

2. The vacuum booster of claim 1 further comprising an input rod extending along the longitudinal axis through the rearward side of the housing and engaging the rearward end of the power piston, whereby an input force exerted against the input rod is transmitted to the power piston.

3. The vacuum booster of claim 1, further comprising a sleeve having a forward end attached to the housing and a rearward end sealingly engaging an outer periphery of said output rod collar, wherein the sleeve defines a sleeve chamber containing atmospheric pressure, and wherein the forward portion of the output rod collar is inside the sleeve chamber.

4. The vacuum booster of claim 3 wherein the sleeve is substantially rigid and cylindrical, and the outer periphery of the output rod collar is shaped to slide along the inside of the sleeve.

5. The vacuum booster of claim 3 wherein the sleeve is substantially flexible and the outer periphery of the output rod collar is attached to the rearward end of the sleeve.

6. The vacuum booster of claim 1 wherein the output rod and the output rod collar are both portions of a monolithic structure.

7. A vacuum booster comprising:
   a housing having a rearward side, a forward side and a longitudinal axis extending therebetween;
   a divider plate separating the housing into a first control volume and a second control volume;
   a primary diaphragm separating the first control volume into a primary apply chamber and a primary vacuum chamber, the primary diaphragm being movable along the longitudinal axis;

a secondary diaphragm separating the second control volume into a secondary apply chamber and a secondary vacuum chamber, the secondary diaphragm being movable along the longitudinal axis;

a power piston movable along the longitudinal axis and having a rearward end and a forward end, the power piston extending through and engaging the primary and secondary diaphragms, and including an axial bore; wherein the rearward end of the power piston is exposed to atmospheric pressure a valve assembly positioned in the axial bore and controlling a diaphragm pressure differential across the primary and secondary diaphragms;

an output rod extending along the longitudinal axis through the forward side of the housing, the output rod engaging the forward end of the power piston to transmit an output force; and an output rod collar connected to the output rod the output rod collar having a forward portion exposed to atmospheric pressure, wherein a surface area of the forward portion of the output rod collar is greater than a surface area of the rearward end of the power piston such that a pressure differential is established to urge the power piston in a rearward direction.

8. The vacuum booster of claim 7 further comprising an input rod extending along the longitudinal axis through the rearward side of the housing and engaging the forward end of the power piston to transmit an input force.

9. The vacuum booster of claim 7 further comprising a sleeve having a forward end attached to the housing and a rearward end sealingly engaging an outer periphery of said output rod collar, wherein the sleeve defines a sleeve chamber containing atmospheric pressure, and wherein the forward portion of the output rod collar is inside the sleeve chamber.

10. The vacuum booster of claim 9, wherein the sleeve is substantially rigid and cylindrical, and the outer periphery of the output rod collar slides on the inside of the sleeve.

11. The vacuum booster of claim 9, wherein the sleeve is substantially flexible and the outer periphery of the output rod collar attaches to the rearward end of the sleeve.

12. The vacuum booster of claim 7 wherein the output rod and the output rod collar are both portions of a monolithic structure.

13. A fluid brake system for a motor vehicle of a type having a vacuum source, a foot pedal and a foot pedal linkage, the fluid brake system comprising:

a set of fluid actuatable brakes in the wheels of the vehicle in fluid communication with a master brake cylinder; and a vacuum booster adapted to be in fluid communication with the vacuum source, operationally engaged to the master brake cylinder, and comprising:

a housing having a forward side, a rearward side and a longitudinal axis extending therebetween, the housing defining a control volume;

a diaphragm separating the control volume into an apply chamber and a vacuum chamber, the diaphragm being movable along the longitudinal axis;

a power piston movable along the longitudinal axis and having a rearward end and a forward end, the power piston extending through and engaging the diaphragm, and including an axial bore wherein the rearward end of the power piston is exposed to atmospheric pressure containing a valve assembly that controls a diaphragm pressure differential acting on the diaphragm;

an input rod adapted to be connected to the foot pedal linkage and extending along the longitudinal axis through the rearward side of the housing and engaging the forward end of the power piston to transmit an input force;

an output rod extending along the longitudinal axis through the forward side of the housing, the output rod engaging the forward end of the power piston to transmit an output force; and an output rod collar connected to the output rod, the output rod collar having a forward portion exposed to atmospheric pressure, wherein a surface area of the forward portion of the output rod collar is greater than a surface area of the rearward end of the power piston such that a pressure differential is established to urge the power piston in a rearward direction.

14. The fluid brake system of claim 13 further comprising a sleeve having a forward end attached to the housing and a rearward end sealingly engaging an outer periphery of said output rod collar, wherein the sleeve defines a sleeve chamber containing atmospheric pressure, and wherein the forward portion of the output rod collar is inside the sleeve chamber.

15. The fluid brake system of claim 14 wherein the sleeve is substantially rigid and cylindrical, and the outer periphery of the output rod collar slides on the inside of the sleeve.

16. The fluid brake system of claim 14, wherein the sleeve is substantially flexible and the outer periphery of the output rod collar attaches to the rearward end of the sleeve.

17. The vacuum booster of claim 13 wherein the output rod and the output rod collar are both portions of a monolithic structure.

* * * * *